(12) United States Patent
Cardone et al.

(10) Patent No.: US 8,390,271 B2
(45) Date of Patent: Mar. 5, 2013

(54) MAGNETIC ANCHORAGE EQUIPMENT WITH A SELF-TEST UNIT

(75) Inventors: Michele Cardone, Trezzano (IT);
Giovanni Cosmai, Rescaldina (IT);
Roberto Faranda, Milan (IT); Antonino Giglio, Pero (IT)

(73) Assignees: Tecnomagnete S.p.A., Lainate, MI (IT);
Politecnico di Milano, Milan (IT)

( * ) Notice: Subject to any disclaimer, the term of this patent is extended or adjusted under 35 U.S.C. 154(b) by 458 days.

(21) Appl. No.: 12/599,948

(22) PCT Filed: Apr. 23, 2008

(86) PCT No.: PCT/IT2008/000284
§ 371 (c)(1),
(2), (4) Date: Nov. 12, 2009

(87) PCT Pub. No.: WO2008/142716
PCT Pub. Date: Nov. 27, 2008

(65) Prior Publication Data
US 2010/0301839 A1     Dec. 2, 2010

(30) Foreign Application Priority Data

May 24, 2007  (IT) .............................. MI2007A1057

(51) Int. Cl.
*G01N 33/12*     (2006.01)
(52) U.S. Cl. .......... 324/205; 324/72; 324/212; 324/262; 335/209; 335/220

(58) Field of Classification Search .................. 324/205; 335/209, 220, 285
See application file for complete search history.

(56) References Cited

U.S. PATENT DOCUMENTS

| | | | | |
|---|---|---|---|---|
| 4,523,250 A | * | 6/1985 | Bacchiere et al. | ............ 361/145 |
| 2007/0290780 A1 | * | 12/2007 | Tiberghien et al. | ........... 335/285 |

FOREIGN PATENT DOCUMENTS

| | | |
|---|---|---|
| FR | 1 414 151 | 10/1965 |
| FR | 2 397 362 | 2/1979 |
| GB | 1 232 951 | 5/1971 |
| WO | WO 97/03911 | 2/1997 |
| WO | WO 03/009972 | 2/2003 |

OTHER PUBLICATIONS

International Search Report for PCT/IT2008/000284, mailed Jan. 15, 2009.
Written Opinion of the International Searching Authority for PCT/IT2008/000284, mailed Jan. 15, 2009.

* cited by examiner

*Primary Examiner* — Reena Aurora
*Assistant Examiner* — Son Le
(74) *Attorney, Agent, or Firm* — Nixon & Vanderhye PC

(57) ABSTRACT

The present invention relates to magnetic anchorage equipment comprising a frame able to contain a plurality of polar units, each of the plurality of polar units having a ferromagnetic polar element which identifies an anchorage surface and a self-testing unit for checking the magnetic equipment. The magnetic anchorage equipment is characterized in that the self-testing unit for checking the magnetic equipment is at least partly integrated in the frame.

22 Claims, 6 Drawing Sheets

MAGNETIC ANCHORAGE EQUIPMENT WITH A SELF-TEST UNIT

This application is the U.S. national phase of International Application No. PCT/IT2008/000284 filed 23 Apr. 2008, which designated the U.S. and claims priority to Italy Application No. MI2007A001057 filed 24 May 2007, the entire contents of each of which are hereby incorporated by reference.

The present invention relates to magnetic anchorage equipment with a self-testing unit for checking and/or controlling this equipment.

The term "self-testing unit" is understood to mean an item of electrical equipment able to execute many functions, including those of estimating the value of the magnetic force developed by the magnetic equipment, estimating other fundamental parameters that can affect the value of the magnetic force developed by the magnetic equipment, such as, for example, the temperature value, and if necessary activating and deactivating the magnetic equipment.

The term "magnetic anchorage equipment" hereafter in the present description is understood to mean:

permanent-magnet equipment, i.e. equipment that does not require an electrical power supply when it is being used during anchorage and while modifying the activation state, produced using permanent magnets appropriately arranged inside the aforementioned equipment;

electropermanent equipment, i.e. equipment that does not require an electrical power supply when it is being used during anchorage, but that does however require an electrical power supply during activation and deactivation, produced using invertible permanent magnets and, if necessary, static permanent magnets appropriately arranged inside the abovementioned equipment;

electromagnetic equipment, i.e. equipment which requires an electrical power supply when it is being used during anchorage, the magnetic core of which is formed by ferromagnetic material.

The above types of magnetic equipment are known and widely used in the prior art.

However, such magnetic equipment, as well as exhibiting undeniable advantages, is still perceived by the market as not very safe.

Such prejudice is due to the nature of the physical principle to which the operation of the magnetic equipment is subject.

Specifically, as is well known in the art, the force that the magnetic field succeeds in generating once magnetic equipment is activated depends on the type of material of the load to be anchored, for example steel, cast iron, iron, etc., and on the state of the contact surfaces and on the distance between them.

The magnetic field generated, and consequently the magnetic force developed by the equipment, could be different every time an anchorage operation is carried out.

This means that, the magnetic equipment, as well as being identified by a maximum anchorable load value (or nominal load), in reality being affected by the type of material and by the shape of the load to be anchored, by the state of the contact surfaces and by the distance between them, can vary its anchoring capacity.

It is therefore clear that the operator, at the moment when a load needs to be anchored using the magnetic equipment, must pay attention to the type of load to be anchored.

In an attempt to overcome such a drawback and to increase the safety level in the use of such magnetic equipment, legislation has recently provided for, in some cases, the introduction of a safety coefficient which links the maximum load that can be anchored by the magnetic equipment to the maximum value of magnetic force that can be developed by the same.

However, it immediately appears clear that it is not sufficient to introduce a safety coefficient to provide the level of confidence which the user of the magnetic equipment needs during daily use, since this safety coefficient can in some cases be excessive and in others insufficient.

Indeed, if the material of the load to be anchored has very good ferromagnetic properties, and if the state of the contact surfaces is very good and the distance between them is small, the outcome is that, under these conditions, the magnetic equipment can anchor its nominal maximum load in total safety.

If these conditions are not met, the outcome is that the magnetic equipment cannot anchor its nominal maximum load in total safety.

It is however worthwhile clarifying that the sensing of the magnetic force developed by the magnetic equipment every time the activation operation is executed is not often simple to execute since the magnetic equipment could be portable or powered via electric cables of significant length.

Magnetic equipment, in particular permanent-magnet equipment is, in fact, generally portable and therefore lacks a self-testing unit for checking and/or control purposes, while magnetic equipment, in particular electropermanent equipment and electromagnetic equipment, is equipped with electric panels (or control and checking units) arranged outside the same equipment.

These electric panels must be equipped with all the electrical and electronic components in order to enable correct operation of such equipment, i.e. capable of activating and deactivating the anchorage surface.

To this end, the electric panel must comprise several circuit sections each of which turns out to be assigned to fulfil a specific task.

However the electric panel can have large dimensions, which can pose a problem for positioning that panel near the magnetic equipment.

The result of this is that it is impossible to carry out some important functions such as the ability to activate only some of the poles of the magnetic surface or the continuous checking of variations in magnetic flux or the monitoring of the temperature of the magnetic equipment, unless very costly techniques are used and often with disappointing results.

Furthermore, also to be noted is the problem that can arise at the moment when magnetic equipment is being tested.

Specifically, in order to make sure of correct operation of the magnetic equipment and of its electric panel, every single component forming the equipment must be tested at the same time, i.e. at the end of the production and assembly of all the components forming the equipment.

If from such testing problems arise, a significant amount of time, energy and money could be spent.

Such drawbacks are made worse particularly in large size magnetic equipment, such as for example an electropermanent press platen, since it is necessary to check and if necessary replace parts of the entire magnetic equipment.

In view of the prior art described, the need to overcome the problems of the abovementioned prior art is particularly sought.

In accordance with the present invention, such an objective is achieved by means of magnetic anchorage equipment in accordance with the present invention.

By virtue of the present invention, it is possible to produce magnetic equipment equipped with a self-testing unit for checking and/or controlling the magnetic equipment and able to check various characteristic operating parameters of the magnetic equipment.

In particular, the checking unit turns out to be at least partly installed on board the magnetic equipment.

By virtue of the present invention, the magnetic equipment can be used extremely safely since the self-testing unit placed near the magnetic equipment automatically senses at least the characteristic parameters proportional to the magnetic force developed by the magnetic equipment every time the activation operation is executed.

Furthermore, by virtue of the present invention, the following advantages can be gained:

self-testing of the magnetic equipment;
measurement of the specific force developed by the magnetic equipment whenever the latter has been activated;
carrying out of a greater number of checks which previously were impossible or disadvantageous from a cost perspective;
activation of only some poles of the magnetic surface;
simplification of the operations for testing the magnetic equipment, since now every unit forming the magnetic equipment can be checked and tested individually.

The features and advantages of the present invention will become clear from the following detailed description of a practical embodiment illustrated by way of non-limiting example in the appended drawings in which.

Figure 1:
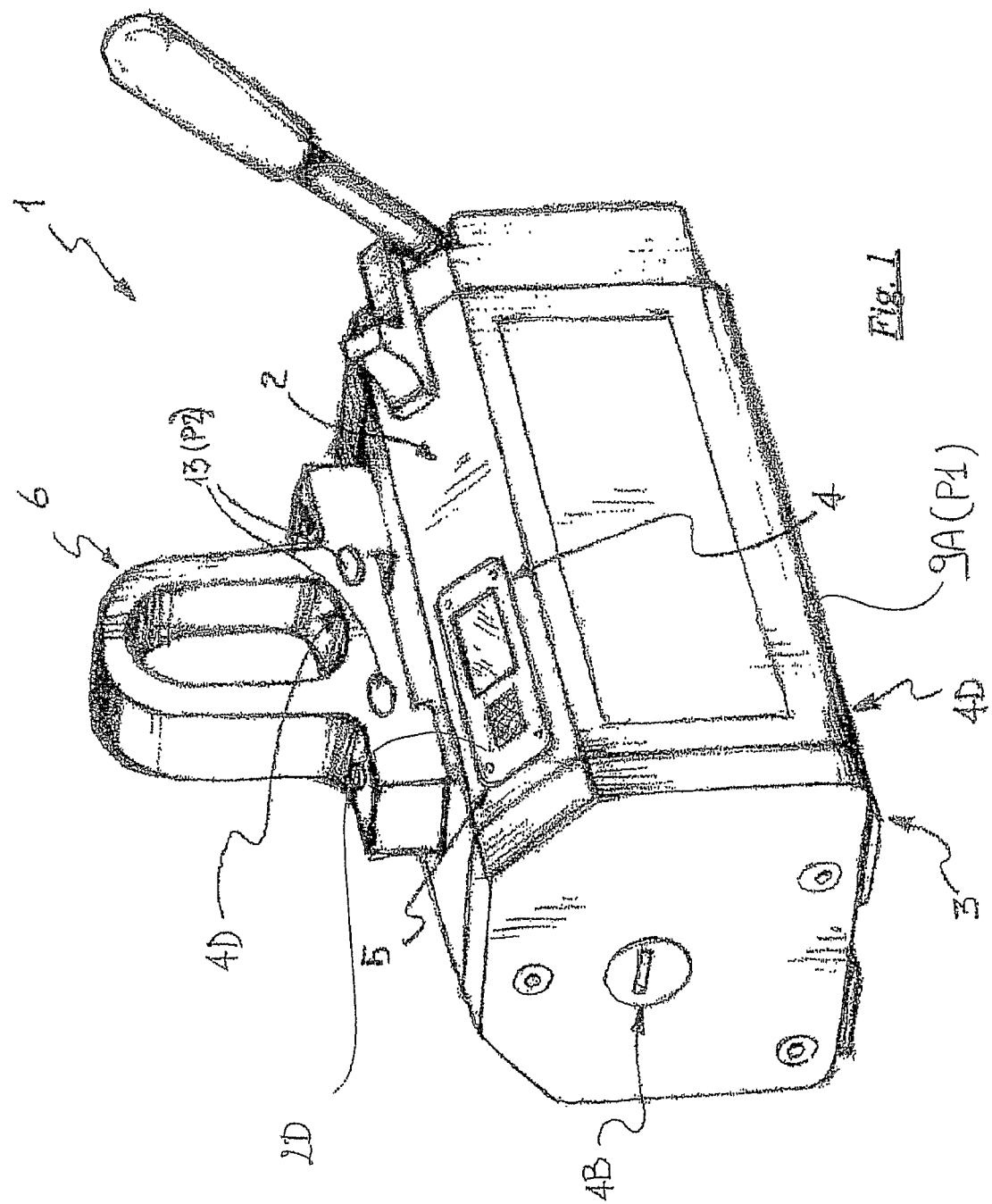
FIG. 1 shows magnetic equipment, such as a permanent-magnet lifter, in accordance with the present invention.

With reference to the appended drawings, the label 1 indicates magnetic equipment comprising a frame 2 able to contain a plurality of polar units, each of which provides a ferromagnetic polar element so as to define an anchorage surface 3.

Inside the magnetic anchorage equipment there is installed at least a part of the self-testing unit 4 able to sense the characteristic operating parameters of that magnetic equipment.

Advantageously, the frame 2 of the magnetic anchorage equipment 1 incorporates within it at least a portion of the self-testing unit 4.

In particular, the frame 2 comprises at least one housing 5,5A,5B having dimensions such that at least the aforementioned portion of the self-testing unit 4 is housed.

In other words, the frame 2 of the equipment 1 comprises at least one 5,5A,5B within which is placed part or all of the electrical and/or electronic circuitry able to monitor the equipment and/or to control, if necessary, the activation and deactivation phases of the anchorage surface 3.

Advantageously, such a housing 5,5A,5B is made in the portion of the frame 2 of the magnetic equipment 1 in which there is limited passage of magnetic flux, so as to avoid problems of electromagnetic compatibility associated in particular with the transition phases between the activation and deactivation states of the anchorage surface 3.

It is worthwhile noting that the housing 5,5A,5B is able to contain within it, in a manner that is protective from external agents such as dust, humidity, etc., the electrical and/or electronic circuit items that are positioned therein.

The electrical and/or electronic circuit items of at least a portion of the self-testing unit 4, which are contained in the housings 5,5A,5B, are appropriately protected by means of resins, insulating films, mechanical covers and/or similar.

Figure 2:
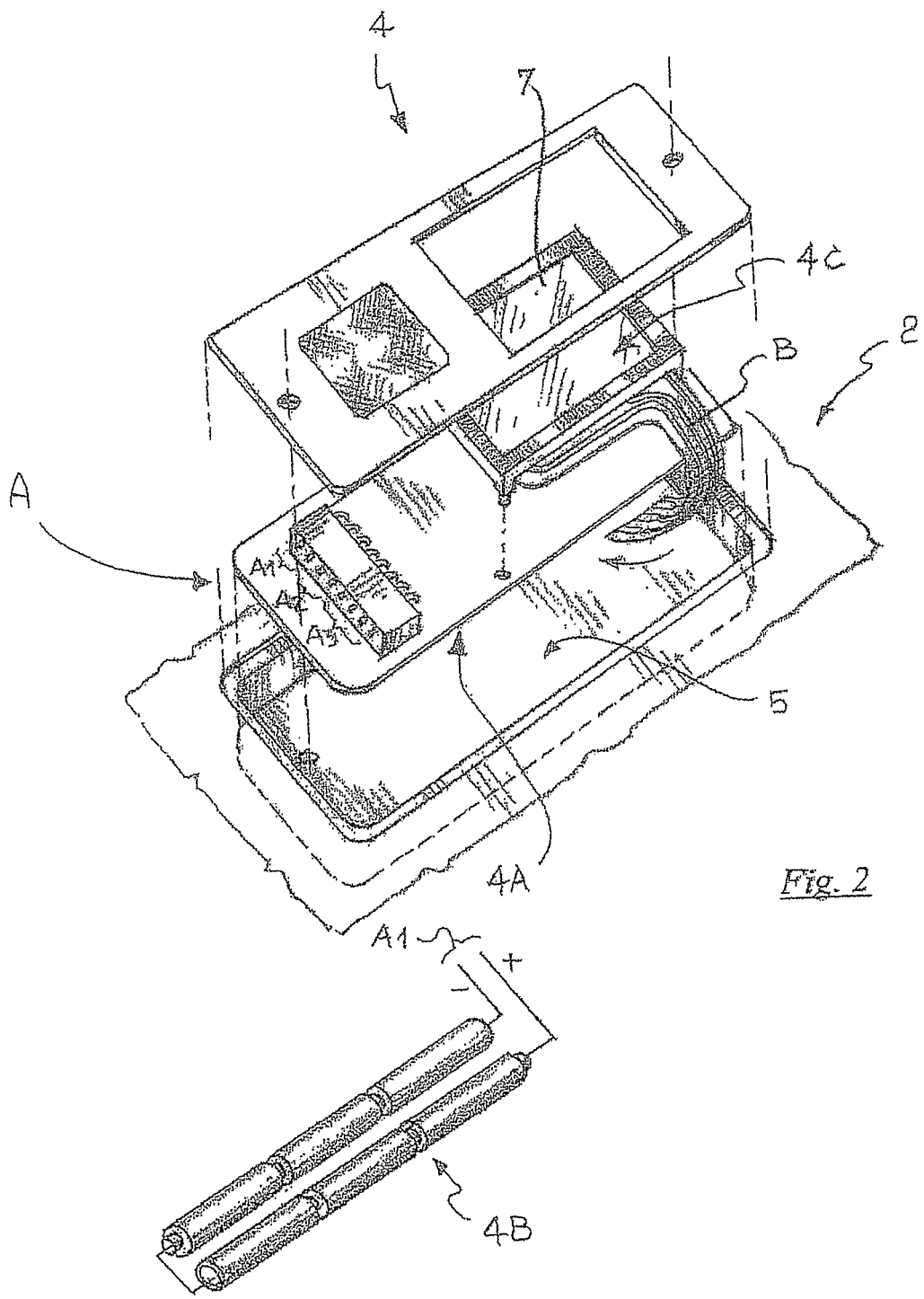
FIG. 2 shows in exploded view a detail of the self-testing unit for checking the magnetic equipment and of the frame of the magnetic equipment of FIG. 1.

With reference now in particular to FIGS. 1 and 2, there is shown a first embodiment of the present invention when applied to magnetic equipment.

The magnetic equipment illustrated in FIGS. 1 and 2 is realized by permanent-magnet equipment such as for example a permanent-magnet lifter, the operation of which is well known to a person skilled in the art and therefore will not be described.

The frame 2 of the permanent-magnet lifter comprises a housing 5 within which is located the portion of the self-testing unit 4 equipped with a microcontroller or a microprocessor.

In the specific embodiment shown in FIGS. 1 and 2, the electrical and/or electronic circuit items forming the self-testing unit 4 turn out to be integrated in the frame 2.

It is worthwhile noting that the housing 5 is able to contain within it, in a manner that is protective from external agents such as dust, humidity, etc., the electrical and/or electronic circuit items that are positioned therein. To this end the frame 2 can comprise, for example, a closure item 2D able to cover in a sealed manner, once attached to that frame, the housing 5.

In such a housing 5, the items forming the self-testing unit 4 can be arranged, such as, for example, the following:

a checking section 4A which is realized by a microprocessor or by a microcontroller, preferably a microcontroller, in order to sense some characteristic parameters P1, P2 and a display section 4C configured such that it can be electrically connected to the checking section 4A.

In the same housing 5 or in another housing (not illustrated in the drawings) a power supply section 4B can be housed.

In a preferred embodiment of the permanent-magnet lifter, such a power supply section 4B turns out to be accommodated in a housing that is separate from the one able to receive the portion of the checking unit 4 equipped with a microcontroller or microprocessor.

For example, the power supply section 4B is realized by a pack of storage batteries, formed by a series of six AA type rod batteries with overall nominal voltage of 7.2 V.

With reference to FIG. 2, in which it is possible to observe some electrical connections between the various sections just listed, it is noted that the power supply section 4B and display section 4C are between them configured such that they can be electrically connected to the checking section 4A, via the electrical connections "A" and "B" respectively.

In particular, the power supply section 4B is electrically connected to the checking section 4A via specific electrical connections "A1" (FIG. 2), while the display section 4C is electrically connected to the checking section 4A via the electrical connections "B" (FIG. 2).

In a preferred embodiment, the display section 4C is realized by a screen 7, for example of the LCD type.

It is worthwhile noting that in FIG. 2, only the items required to understand the operation and the realization of the present invention have been illustrated. A person skilled in the art will be able to understand which other items are required, how to design them, implement them and connect them to the items illustrated in order to produce a complete diagram of the self-testing unit 4.

Advantageously the self-testing unit 4 is able to sense the characteristic operating parameters of the permanent-magnet lifter via appropriate acquisition means 4D.

Such acquisition means 4D comprise first acquisition means 9A which are able to acquire a first signal representing a first characteristic parameter P1 of the permanent-magnet lifter.

The first parameter P1 turns out to be representative of the value of the force developed by the magnetic lifter, once the anchorage surface 3 has been activated.

The first acquisition means 9A comprise a coil which turns out to be positioned along the perimeter of at least one of the polar units forming the anchorage surface 3.

For example, the permanent-magnet lifter shown in FIG. 1 can provide for one or two polar units along which the coil 9A is positioned.

These first acquisition means 9A are electrically connected to the checking section 4A via specific electrical connections "A2" (FIG. 2).

At the moment when the magnetic equipment is activated, the checking section 4A measures the signal originating from the coil 9A and processes it carrying out an integration operation from which there is obtained a value proportional to the outgoing magnetic flux and therefore to the force developed by the at least one of the polar units forming the anchorage surface 3.

Advantageously, the display section 4C, via the screen 7, is able to display the value of the first characteristic parameter P1.

The screen 7 of the lifter, hence, provides the operator the value of the force developed by the magnetic lifter.

The operator is therefore capable of making sure, every time the magnetic lifter is activated, whether the value of force developed by the magnetic lifter is compatible with the weight of the load to be lifted.

It is worthwhile noting that the acquisition means 4D comprise second acquisition means 13 which are able to acquire a second signal representing a second characteristic parameter P2 of the permanent-magnet lifter.

The second characteristic parameter P2 turns out to be representative of the weight of the lifted load (not illustrated in the drawings).

To this end, the second acquisition means 13 comprise a load cell, for example, arranged inside the eyebolt opening 6 of the permanent-magnet lifter.

Such a load cell is electrically connected to the checking section 4A via specific electrical connections "A3" (FIG. 2).

At the moment when the magnetic equipment is activated and the load is lifted, the signal originating from the second acquisition means 13, which turns out to be proportional to the weight of the load lifted by the magnetic lifter, is acquired by the checking section 4A.

The checking section 4A is therefore, advantageously, responsible for comparing the value obtained by integrating the first characteristic parameter P1 with the value of the second characteristic parameter P2 in such a way that the display section 4C, via the display 7, can inform the operator of the value resulting from this comparison.

In other words, following the comparison between the first characteristic parameter P1 and the second characteristic parameter P2, it is possible to continuously check whether the force developed by the permanent-magnet lifter is high enough to ensure a safe lifting of the load anchored to the lifter.

Therefore by virtue of the check executed by the checking unit 4 on the permanent-magnet lifter through the sensing of the characteristic parameters P1 and P2, the user is informed of the force developed by the permanent-magnet lifter every time an activation phase takes place and is constantly informed of the weight of the lifted load anchored to the lifter and, above all, whether this load can be moved safely.

Figure 3:
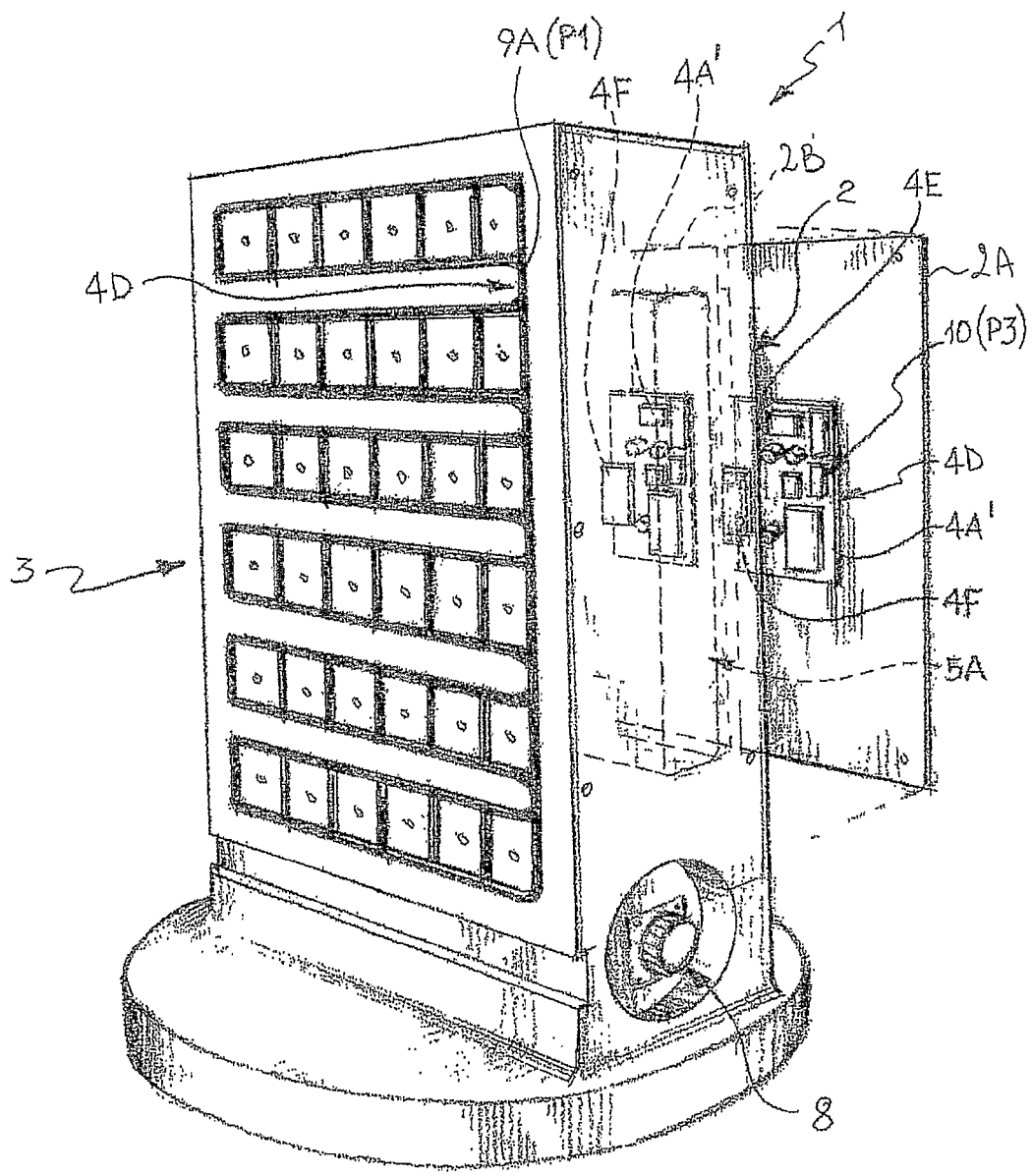
FIG. 3 shows the magnetic surface of another item of magnetic equipment, such as a vertical-surface electropermanent magnetic pallet and a portion of the self-testing unit for checking and/or controlling the magnetic equipment, in accordance with the present invention.
Figure 4:
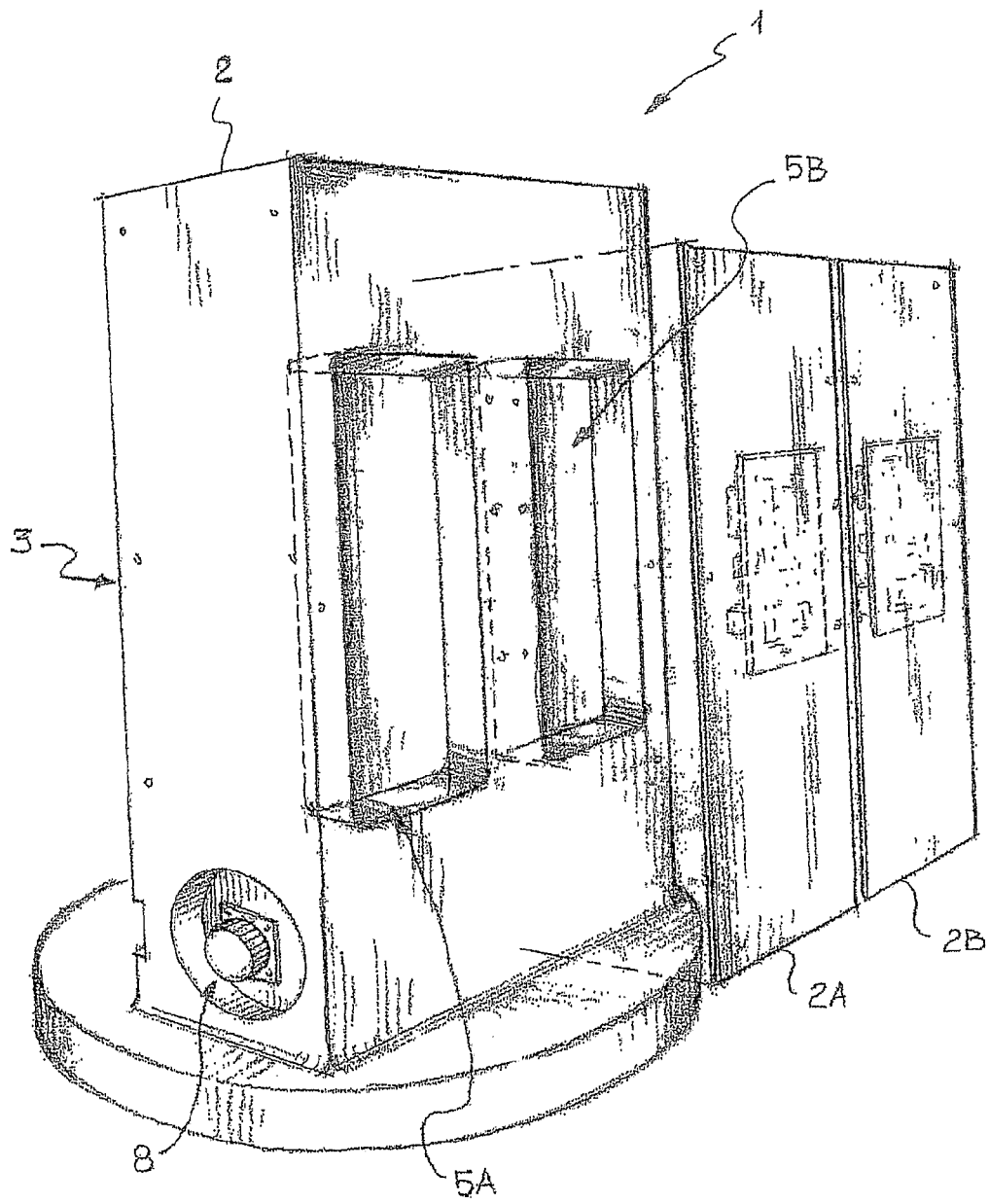
FIG. 4 shows the rear part of the magnetic equipment of FIG. 3.

With reference now to FIGS. 3 and 4, a second embodiment of the present invention is shown, when applied to another item of magnetic equipment.

The magnetic equipment illustrated in FIGS. 3 and 4 is realized by electropermanent magnetic equipment, for example a vertical-surface electropermanent magnetic pallet, the operation of which is well known to a person skilled in the art and therefore will not be described.

In the specific embodiment represented in FIGS. 3 and 4, the frame 2 of the vertical-surface electropermanent magnetic pallet provides for two separate housings 5, identified in these drawings by the labels 5A and 5B, each of which is, for example, intended to receive a portion of the self-testing unit 4.

It is worthwhile noting that in the specific representation of FIGS. 3 and 4 only a part of the self-testing unit 4 has been highlighted, in particular two supervision boards and the acquisition means 4D, but, depending on the number of polar units present on the anchorage surface 3, only one or more than two supervision boards and other acquisition means 4D could be present, as well as other devices.

It is worthwhile noting that the housings 5A and 5B are able to contain within them, in a manner that is protective from external agents such as dust, humidity, etc., the electrical and/or electronic circuit items which are positioned therein. The electrical and/or electronic circuit items of at least a part of the self-testing unit 4, which are contained in the housings 5A and 5B, are appropriately protected by means of resins, insulating films, mechanical coverings and/or similar.

To this end the frame 2 can comprise, for example, for each of these housings 5A and 5B, a closure item, indicated in the drawings by the labels 2A and 2B respectively, each of which is able to cover in a sealed manner, once attached to that frame, the two housings 5A and 5B.

In the specific embodiment illustrated, the portions of the self-testing unit 4 turn out to be attached to these closure items 2A and 2B.

In other words, the portions of the self-testing unit 4 are directly attached to the closure items 2A and 2B and electrically connected to the magnetic pallet via appropriate electrical connections (not illustrated in the drawings).

The electrical and/or electronic circuit items of each portion of the checking unit 4 which turn out to be housed in the housings 5A and 5B, and are therefore arranged inside the frame 2, can be:

a checking and control section 4A' which is realized by a
        microprocessor or by a microcontroller, preferably a
        microcontroller, in order to sense some characteristic
        parameters P1 and P3 and to control the activation and/
        or deactivation operations of the anchorage surface 3,
    a power section 4E and
    a communication section 4F.

The various sections just listed are between them configured such that they can be electrically connected to the checking and control section 4A'.

In the housings 5A and 5B of the frame 2 of the magnetic pallet, there is therefore no space for, for example, the power supply section (not illustrated in the drawings) which makes it possible to activate and deactivate the magnetic surface 3.

The vertical-surface electropermanent magnetic pallet and the power supply, which in a preferred solution could be the mains voltage, are connected through the connector 8.

In a preferred embodiment, the power section 4E is realized by a series of electronic valves which, appropriately controlled by the checking and control section 4A', provide for activating and deactivating every single pole of the anchorage surface 3.

In a preferred embodiment, the communication section 4F is realized, for example, by a device able to send all the data concerning the magnetic equipment and to receive all the control data using a predefined protocol.

Therefore the portion of the self-testing unit 4, contained in the housings 5A and 5B provided in the frame 2, is able to sense a plurality of characteristic operating parameters P1 and P3 of the vertical-surface electropermanent magnetic pallet using appropriate acquisition means 4D, in addition to being able to activate and/or deactivate every single pole of the anchorage surface 3.

These acquisition means 4D, as described in relation to the permanent-magnet lifter of FIGS. 1 and 2, comprise first acquisition means 9A which are able to acquire a first signal representing a first characteristic parameter P1 of the vertical-surface electropermanent magnetic pallet.

The coil 9A turns out to be positioned along the perimeter of each polar unit defining the anchorage surface 3 and is electrically connected to the checking and control section 4A' via specific electrical connections (not illustrated in the drawings).

The first characteristic parameter P1 turns out to be representative of the value of the force developed by every single magnetic pole of the abovementioned magnetic pallet, once every single magnetic pole of the anchorage surface 3 has been activated.

At the moment when the magnetic equipment is activated, the checking and control section 4A' measures the signal originating from the coil 9A, processes it carrying out an integration operation and obtaining a value proportional to the outgoing magnetic flux and therefore to the force developed by the at least one of the polar units forming the anchorage surface 3.

It is worthwhile noting that the checking and control section 4A' is, in a first phase, responsible for comparing the first characteristic parameter P1 with a predefined value, for example stored in a memory forming part of this checking and control section 4A'.

This predefined value is representative of the value of force desired for every single polar unit so as to be able to check the effective proximity between every single polar unit and the piece (not illustrated in the drawings) to be anchored.

Specifically, if the measured value of the first characteristic parameter P1 is greater than the predefined value, then the polar unit of the plurality of polar units defining the anchorage surface 3 is considered to be covered by the piece to be anchored and therefore will then be activated.

Conversely, if the measured value of the first characteristic parameter P1 is less than the predefined value, then the polar unit of the plurality of polar units defining the anchorage surface 3 is considered not to be covered by the piece to be anchored and therefore it will not then be activated.

In other words, the first characteristic parameter P1 is compared with a predefined value in order to check the effective proximity between every single polar unit and the piece to be anchored.

By virtue of this, in the second operational phase of the vertical-surface electropermanent magnetic pallet, every single pole of the magnetic surface 3 that is not covered by the piece to be anchored turns out to be deactivated and therefore lacking magnetic force.

In this second phase, which turns out to be immediately after the abovementioned first phase, the checking and control section 4A' is able to sense once again the first characteristic parameter P1 so as to estimate the value of the force actually exerted by only the activated poles on the anchored piece.

Advantageously, therefore, a chip formed during the manufacturing operation on the piece anchored to the anchorage surface 3 is prevented from being stopped near that piece, ensuring manufacturing operations that are faster, more accurate and more precise, thus avoiding, for example, suspending the manufacturing operation to free up the tool from the chip.

The acquisition means 4D also comprise third acquisition means 10 which are able to acquire a third signal representing a third characteristic parameter P3 of the vertical-surface electropermanent magnetic pallet.

The third characteristic parameter P3 represents the polarity and the value of the current flowing in the vertical-surface electropermanent magnetic pallet.

To this end, the third acquisition means comprise, for example, a Hall effect sensor fitted on the checking and control section 4A'.

At the moment when the magnetic equipment is activated, the checking and control section 4A' acquires the signal originating from the Hall effect sensor which is proportional to the instantaneous value and to the polarity of the electric current flowing in the at least one of the polar units forming the anchorage surface 3.

It is worthwhile noting that the checking and control section 4A' is responsible for checking that the third characteristic parameter P3 is consistent with the operation planned by the operator so as to be certain that the operation has been executed correctly on every single pole of the magnetic surface 3.

It is worthwhile noting that the self-testing unit 4 can additionally comprise a display section (not illustrated in the drawings) which turns out to be electrically connected to the communication section 4F via an electrical connection forming part of the connector 8.

In this embodiment, the checking and control section 4A' is able to send all the data obtained to that display section, which can be realized by a screen (not illustrated in the drawings) for example of the LCD type.

On this screen there can appear a graphical representation of the value of the first characteristic parameter P1, or a graphical representation of the magnetic surface 3, so as to illustrate, for example, by changing the colour of the poles according to activation state, which pole has been activated and which has not, enabling the operator to make certain, at every activation of the magnetic pallet, of the correct operation of the magnetic equipment and of the correct positioning of the piece.

It is also worthwhile noting that such a screen can be arranged outside the frame 2 of the vertical-surface electropermanent magnetic pallet.

Alternatively the signal communication with the display section can be implemented by a wireless system.

The checking and control section 4A' of the self-testing unit 4 can also be equipped with a device which, after having sensed the value of the magnetic force, i.e. the first characteristic parameter P1, is able to send it to a manufacturing machine. The latter, depending on this value, can suitably modify the planned manufacturing operations on the piece.

By virtue therefore of the check carried out by the self-testing unit 4 on the magnetic pallet by the sensing of the characteristic parameters P1 and P3, the user is constantly informed of the value of magnetic force generated by the anchorage surface 3 of the magnetic pallet and, above all, whether the manufacturing operations to be executed on the anchored piece can be performed in complete safety.

Figure 5:
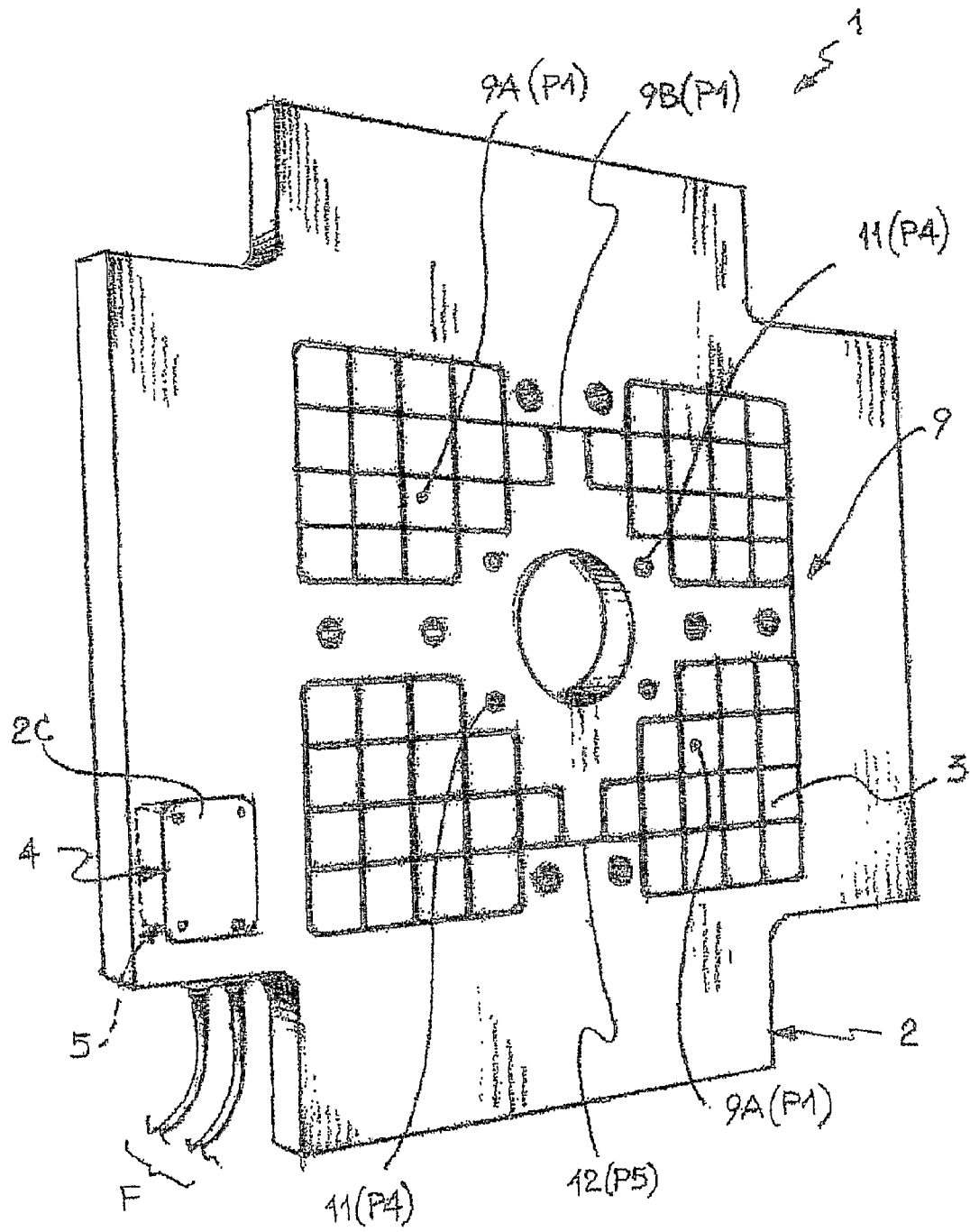
FIG. 5 shows a further item of magnetic equipment, such as a vertical surface electropermanent press platen, in accordance with the present invention.
Figure 6:
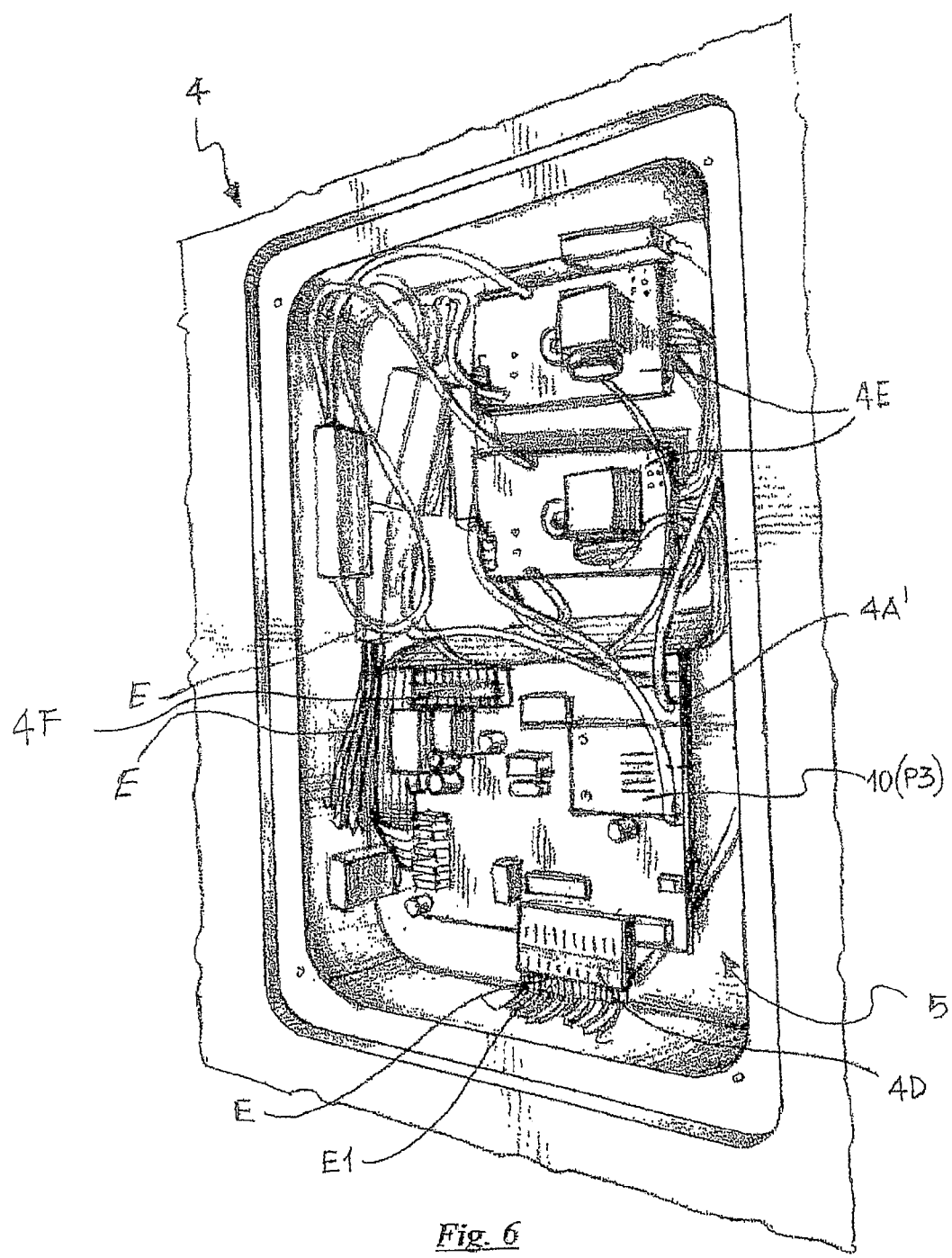
FIG. 6 shows a portion of the self-testing unit for checking and/or controlling the magnetic equipment of FIG. 5.

With reference now to FIGS. 5 and 6, a third embodiment of the present invention is shown, when applied to a further item of magnetic equipment.

The magnetic equipment illustrated in FIGS. 5 and 6 is realized by electropermanent magnetic equipment, for example a vertical-surface electropermanent press platen, the operation of which is well known to a person skilled in the art and therefore will not be described.

In particular, it is noted that the frame 2 comprises at least one housing 5, which turns out to be able to house within it a portion of the self-testing unit 4.

It is worthwhile noting that the housing 5 is able to contain within it, in a manner that is protective from external agents such as dust, humidity, etc., the electrical and/or electronic circuit items which are positioned therein. The electrical and/or electronic circuit items of at least a part of the self-testing unit 4, which are contained in the housing 5, are appropriately protected by means of resins, insulating films, mechanical coverings and/or similar.

To this end the frame 2 can comprise, for example, a closure item 2C able to cover in a sealed manner, once attached to that frame, the housing 5.

The electrical and/or electronic circuit items of the portion of the self-testing unit 4 which can be located inside the housing 5 can be:
- a checking and control section 4A' which is realized by a microprocessor or by a microcontroller, preferably a microcontroller, to sense some characteristic parameters P1, P3, P4 and P5 and to control the operations for activating and deactivating the anchorage surface 3,
- a power section 4E and
- a communication section 4F.

With reference to FIG. 6, in which it is possible to observe some electrical connections between the various sections just listed, it is noted that the power section 4E and communication section 4F are between them configured such that they can be electrically connected to the checking and control section 4A' via electrical connections generically indicated by the label "E".

It is worthwhile noting that in FIG. 6, only the items needed to understand the operation and the realization of the present invention have been illustrated. A person skilled in the art will be able to understand which other items are necessary, how to design them, implement them and connect them to the items illustrated in order to produce a complete diagram of the self-testing unit 4.

In a preferred embodiment, the power section 4E is realized by a series of electronic valves which, appropriately controlled, provide for activating and deactivating the anchorage surface 3.

In a preferred embodiment, the communication section 4F is realized, for example, by a device able to send all the data concerning the magnetic equipment and to receive all the control data using a predefined protocol.

In the at least one housing 5 of the frame 2 of the press platen, there is therefore no space for, for example, the power supply section (not illustrated in the drawings) which makes it possible to activate and deactivate the magnetic surface 3.

The vertical-surface electropermanent press plate and the power supply, which in a preferred solution could be the mains voltage, are connected through the electrical connection "F".

Therefore the portion of the self-testing unit 4, contained in the housing 5 provided in the frame 2, is able to sense a plurality of characteristic operating parameters P1, P3, P4 and P5 of the vertical-surface electropermanent press platen via appropriate acquisition means 4D, in addition to being able to activate and/or deactivate every single pole of the anchorage surface 3.

These acquisition means 4D are therefore able to acquire a first signal representing a first characteristic parameter P1.

The first parameter P1 represents the value of the force developed by a single pole of the platen and by all the poles of that platen, once the anchorage surface 3 has been activated.

To this end, the first acquisition means comprise a first coil 9A which turns out to be positioned along the perimeter of at least one polar unit forming part of the anchorage surface 3 and a second coil 9B which turns out to be positioned along the perimeter of each polar unit (or only the north polar units or only the south polar units) of the anchorage surface 3.

These coils 9A and 9B are electrically connected to the checking and control section 4A' via specific electrical connections "E1" (FIG. 6).

At the moment when the magnetic equipment is activated, the checking and control section 4A' measures the signals originating from the coils 9A and 9B and, integrating them appropriately, obtains two different values proportional to the outgoing magnetic flux, and therefore to the force developed, of the individual polar units forming the anchorage surface 3.

Therefore the coils 9A, 9B are required to estimate the force developed by the vertical-surface electropermanent press platen unlike for the permanent-magnet lifter and the vertical-surface electropermanent magnetic pallet.

Hence the checking and control section 4A' is able to combine both the signals sensed by each coil 9A, 9B so as to obtain the first characteristic parameter P1, estimating, therefore, the value of the magnetic force exerted by the magnetic surface 3 on the mould (not illustrated in the drawings).

In particular, the value of the first characteristic parameter P1 can advantageously be displayed in order to enable the operator to check for correct operation of the magnetic equipment and the correct positioning of the mould, or, can advantageously be used to automatically execute all the controls required on the press machine to prevent the magnetic surface 3 from being able to be stressed with values of force that are not suited to the magnetic anchorage force developed by the magnetic surface 3.

It is also worthwhile noting that, in a preferred embodiment of the present invention, the acquisition means 4D comprise third acquisition means 10 which are able to acquire a third signal representing a third characteristic parameter P3 of the press platen.

Even in this particular magnetic equipment, the third characteristic parameter P3 represents the polarity and the value of the current flowing in this vertical-surface electropermanent press platen.

To this end, the third acquisition means 10 comprise, for example, a Hall effect sensor, which can be installed in the checking and control section 4A'.

During activation of the magnetic equipment, the checking and control section 4A' acquires the signal originating from the Hall effect sensor which is proportional to the instantaneous value and to the polarity of the electric current flowing in the polar units forming the anchorage surface 3.

It is worthwhile noting that the checking and control section 4A' is advantageously responsible for checking that the third characteristic parameter P3 is consistent with the operation planned by the operator so as to be certain that the operation has been executed correctly on the magnetic surface 3.

It is also worthwhile noting that, in another preferred embodiment of the present invention, the acquisition means 4D comprise, furthermore, fourth acquisition means 11 which are able to acquire a fourth signal representing a fourth characteristic parameter P4 of the press platen.

The fourth characteristic parameter P4 represents the presence and/or the absence of a mould near the anchorage surface 3 of this vertical-surface electropermanent press platen.

To this end, the fourth acquisition means 11 comprise one or more proximity sensors, for example, of the inductive type positioned near the centre of the vertical-surface electropermanent press platen and which are responsible for varying their activation state from the open-contact condition to the closed-contact condition according to the distance of the mould from the anchorage surface 3.

These fourth acquisition means 11 are electrically connected to the checking and control section 4A' via specific electrical connections "E1".

When the mould turns out to be very close to the magnetic equipment, the state of the acquisition means 11 changes indicating to the checking and control section 4A' the presence of the mould near the anchorage surface 3.

If the anchorage surface 3 must be activated, its activation is prevented until these proximity sensors detect the presence of the mould.

It is worthwhile noting that the proximity sensors, in the event that the anchorage surface 3 is activated, provide for immediately interrupting the manufacturing operation process if these sensors no longer detect the presence of the mould.

The presence of more proximity sensors which turn out to be in signal communication with the checking and control section 4A' furthermore provide for, advantageously, also carrying out consistency checks between the sensed states in order make sure of the correct operation of every single sensor.

It is worthwhile noting that, in another preferred embodiment of the present invention, the acquisition means 4D furthermore comprise fifth acquisition means 12 which are able to acquire a fifth signal representing a fifth characteristic parameter P5 of the press platen.

In particular the signal originating from the acquisition means 12 is a voltage directly proportional to the average temperature of the anchorage surface 3.

The fifth characteristic parameter P5 represents therefore the value of the temperature present on the anchorage surface 3 of this press platen.

These fifth acquisition means 12 are electrically connected to the checking and control section 4A' via specific electrical connections "E1".

It is worthwhile noting that in light of the fact that the interval of values of variation of the temperature of the magnetic equipment is of a small range, variable for example from 10° C. to 210° C., and that in this temperature interval the response to variations in the temperature of the metallic materials forming the first acquisition means 4D, i.e. the coils 9A and 9B, turns out to be known, the fifth acquisition means 12 can coincide with the coils 9A and/or 9B.

When it is desired to estimate the value of the temperature of the magnetic equipment, a current of known value is therefore made to flow inside one of the coils 9A or 9B, and thus the voltage value measured by the checking and control section 4A' turns out to be proportional to the average temperature of the anchorage surface 3.

Alternatively, the fifth acquisition means 12 can be implemented using one or more temperature sensors such as for example thermocouples positioned near the central part of the mould.

If the checking and control section 4A' determines, according to the value of the parameter P5, that there is a temperature greater than a predetermined value, for example 120° C., the checking and control section 4A' sends this data to the part of the self-testing unit 4 (not represented in the drawings) that is able to interrupt the press process, for example, opening an enabling switch and/or communicating the data to the press machine using a communication protocol that is compliant with the CANopen specifications.

It is worthwhile noting that the checking and control section 4A', and also in general the self-testing checking unit 4, in addition to being responsible for comparing the characteristic parameters P1 and P3, are also able to compare between them all the characteristic parameters P1, P3, P4 and P5 so as to assess whether to continue with and/or interrupt the press operations.

Advantageously, the self-testing unit 4 can comprise a display section (not illustrated in the drawings) which turns out to be electrically connected to the communication section 4F via a dedicated electrical connection "F".

In this embodiment, the checking and control section 4A' is able to send all the data obtained to this display section, which can be realized by a screen (not illustrated in the drawings) for example of the LCD type.

It is worthwhile noting that this screen can be arranged outside the frame 2 of the press platen.

Therefore by virtue of the check carried out by the self-testing unit 4 on the press platen through the sensing of the characteristic parameters P1, P3 P4 and P5, the user is constantly informed of the force developed by the press platen, the temperature of the anchorage surface 3, whether the mould is anchored safely to the anchorage surface 3 and, above all, is capable of reducing the stresses of the press machine on the mould.

Clearly a person skilled in the art, with the aim of satisfying contingent and specific requirements, may introduce a number of modifications and variants to the configurations described above, all nevertheless contained within the scope of protection of the invention as defined by the following claims.

The invention claimed is:

1. Magnetic anchorage equipment comprising:
   a frame containing at least one polar unit having a ferromagnetic polar element which identifies an anchorage surface;
   a self-testing unit for checking the magnetic equipment comprising data acquisition means, said data acquisition means being able to acquire a plurality of signals each of which identifies one of a plurality of characteristic parameters of the magnetic anchorage equipment;
   and at least one housing;
   the self-testing unit comprising a checking section for checking said plurality of characteristic parameters, said checking section being contained in said at least one housing, said at least one housing being defined in said frame;
   wherein the data acquisition means comprise first acquisition means which are able to acquire a first signal identifying a first characteristic parameter (P3) of the magnetic equipment, the first characteristic parameter (P3)

being proportional to the instantaneous value of the current flowing in the at least one polar unit identifying the anchorage surface.

2. Magnetic anchorage equipment according to claim 1, wherein the data acquisition means second comprise acquisition means which are able to acquire a first signal identifying a second characteristic parameter (P1) of the magnetic equipment, the second characteristic parameter (P1) being proportional to the value of the force developed by the magnetic equipment.

3. Magnetic anchorage equipment according to claim 2, wherein the second acquisition means comprise a first coil positioned along the perimeter of the at least one polar unit forming the anchorage surface.

4. Magnetic anchorage equipment according to claim 3 wherein the magnetic equipment is electropermanent magnetic equipment and the self-testing unit comprises a checking and control section, a power section, a communication section, the checking and control section, the power section and the communication section being contained in the at least one housing.

5. Magnetic anchorage equipment according to claim 4, wherein the fifth acquisition means coincide with the first and/or the second coil.

6. Magnetic anchorage equipment according to claim 4, wherein the average temperature of the anchorage surface is proportional to a predetermined current flowing inside the first and/or the second coil.

7. Magnetic anchorage equipment according to claim 1, wherein the first acquisition means comprise a Hall effect sensor.

8. Magnetic anchorage equipment according to claim 2, wherein the magnetic equipment is a permanent-magnet equipment and the self-testing unit comprises a power supply section and a display section, said power supply section said display section being contained in said at least one housing.

9. Magnetic anchorage equipment according to claim 8, wherein the display section comprises a screen electrically connected to the checking section, the screen being attached to the frame.

10. Magnetic anchorage equipment according to claim 8, wherein the data acquisition means comprise third acquisition means which are able to acquire a second signal identifying a third characteristic parameter (P2) of the magnetic equipment, the third characteristic parameter (P2) being proportional to the weight of a lifted load.

11. Magnetic anchorage equipment according to claim 10, wherein the checking section is able to compare the second characteristic parameter (P1) with the third characteristic parameter (P2) in such a way that the display section displays the value resulting from that comparison.

12. Anchorage equipment according to claim 11, wherein the screen is able to display the value of the second characteristic parameter (P1) and/or able to display the value of the third characteristic parameter (P2) and/or the result of the comparison between the second characteristic parameter (P1) and the third characteristic parameter (P2).

13. Magnetic anchorage equipment according to claim 10, wherein the magnetic equipment is electropermanent magnetic equipment and the self-testing unit comprises a checking and control section, a power section, a communication section, the checking and control section, the power section and the communication section being contained in the at least one housing.

14. Magnetic anchorage equipment according to claim 13, wherein the display section comprises a screen electrically connected to said checking and control section and to the data acquisition means, the screen being able to display the value of the second characteristic parameter (P1).

15. Magnetic anchorage equipment according to claim 13, wherein the checking and control section is able to compare the second characteristic parameter (P1) with a predefined value, and if the second characteristic parameter (P1) is greater than the predefined value, then at least one polar unit is activated, otherwise if the second characteristic parameter (P1) is less than the predefined value, then at least one polar unit is not activated.

16. Magnetic anchorage equipment according to claim 13, wherein the second acquisition means comprise a second coil which turns out to be positioned along the perimeter of at least one polar unit in order to sense the second characteristic parameter (P1).

17. Magnetic anchorage equipment according to claim 16, wherein the data acquisition means comprise fifth acquisition means which are able to acquire a fifth signal identifying a fifth characteristic parameter (P5) of the magnetic equipment, the fifth characteristic parameter (P5) being proportional to the average temperature of the anchorage surface.

18. Magnetic anchorage equipment according to claim 13, in which the checking section and/or the checking and control section comprises at least a microprocessor or a microcontroller.

19. Magnetic anchorage equipment according to claim 10, wherein the data acquisition means comprise fourth acquisition means which are able to acquire a fourth signal identifying a fourth characteristic parameter (P4) of the magnetic equipment, the fourth characteristic parameter (P4) being representative of the presence and/or absence of a mould near the anchorage surface.

20. Magnetic anchorage equipment according to claim 19, wherein the fourth acquisition means comprises one or more proximity sensors.

21. Magnetic anchorage equipment according to claim 19 wherein the data acquisition means comprise fifth acquisition means which are able to acquire a fifth signal identifying a fifth characteristic parameter (P5) of the magnetic equipment, the fifth characteristic parameter (P5) being proportional to the average temperature of the anchorage surface.

22. Magnetic anchorage equipment according to claim 21, in which the display section comprises a screen electrically connected to the self-testing unit, the screen being able to display the value of the first, third, fourth and/or fifth characteristic parameter, P3, P2, P4, P5).

* * * * *